United States Patent Office 3,667,955

Patented June 6, 1972

3,667,955

TWO-COMPONENT DIAZOTYPE PHOTOSENSITIVE MATERIAL

Shigeaki Yoshida, Yokohama-shi, Kanagawa-ken, and Tadashi Saito, Kawasaki-shi, Kanagawa-ken, Japan, assignors to Kabushiki Kaisha Ricoh, Tokyo, Japan No Drawing. Filed June 6, 1969, Ser. No. 831,202
Claims priority, application Japan, June 15, 1968, 43/41,288
Int. Cl. G03c *1/58, 1/54*
U.S. Cl. 96—91 R 8 Claims

ABSTRACT OF THE DISCLOSURE

Two-component diazotype photosensitive material containing a coupling component of the following general Formula 1 and a diazocompound of the following general Formula 2 gives a navy blue or dark blue dye-image having high density and fastness by developing in an alkaline solution or vapor.

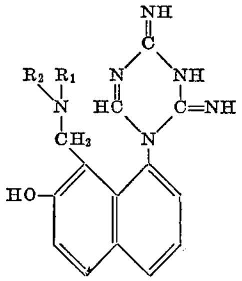

(1)

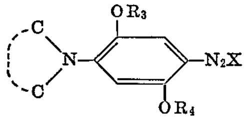

(2)

BACKGROUND OF THE INVENTION

(A) Field of the invention

The present invention relates to two-component diazotype photosensitive material containing a compound having the following general Formula 1 as a coupling component:

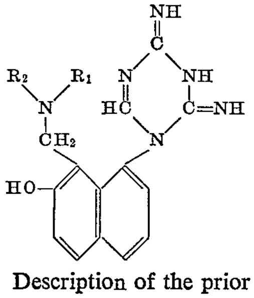

(1)

(B) Description of the prior art

Two-component diazotype photosensitive material containing a diazocompound and a coupling component in a photosensitive layer has been disclosed in the Japanese patent publication No. 43/4928 (1968), said coupling component being derivatives of aminonaphthol. Such photosensitive materials have defects that they give a light purple-blue dye-image when developed in an alkaline solution or vapor and the dye-image thus obtained is easy to discolor or fade.

It is, therefore, an object of the present invention to provide two-component diazotype photosensitive material capable of giving a dye-image of high density and fastness.

SUMMARY OF THE INVENTION

The present invention relates to two-component diazotype photosensitive material containing a coupling component and a diazocompound in a photosensitive layer, and capable of developing in an alkaline solution or vapor and giving a vivid dye-image of high density and fastness.

The compounds having a following general Formula 1 are used as a coupling component and these coupling components are novel and have not been disclosed in the literature.

The general formula of the aforementioned coupling component is as follows:

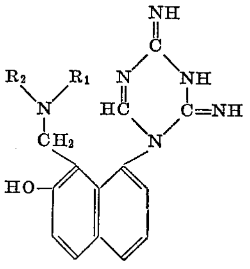

(1)

wherein $R_1$ and $R_2$ are the same or different alkyl radical of from 1 to 4 carbon atoms, or they may be linked together with nitrogen to complete a heterocyclic ring system which may be contain one or more substituents.

These coupling components are very soluble in water, do not cause to coagulate with diazocompounds to produce a clear photosensitive solution, do not contaminate the substrate of the photosensitive material and give a vivid dye-image of high density and fastness when coupled with a suitable diazocompound.

The examples of these coupling components are in following:

1-(2',4'-diimino-3'-hydro-1',3',5'-triazino)-7-hydroxy-8-dimethylaminomethyl-naphthalene (M.P. 209–211° C.),
1-(2',4'-diimino-3'-hydro-1',3',5'-triazino)-7-hydroxy-8-diethylaminomethyl-naphthalene (M.P. 209–212° C.),
1-(2',4'-diimino-3'-hydro-1',3',5'-triazino)-7-hydroxy-8-dipropylaminomethyl-naphthalene (M.P. 211–212° C.),
1-(2',4'-diimino-3'-hydro-1',3',5'-triazino)-7-hydroxy-8-dibutylaminomethyl-naphthalene (M.P. 211–213° C.),
1-(2',4'-diimino-3'-hydro-1',3',5'-triazino)-7-hydroxy-8-morpholinomethyl-naphthalene (M.P. 214–215° C.),
1-(2',4'-diimino-3'-hydro-1',3',5'-triazino)-7-hydroxy-8-piperazinomethyl-naphthalene (M.P. 214–215° C.),
1-(2',4'-diimino-3'-hydro-1',3',5'-triazino)-7-hydroxy-8-piperidinomethyl-naphthalene (M.P. 213–214° C.).

A method of producing one of the above-mentioned compounds is, for example, as follows:

1-biguanidino-7-naphthol (sold by American Hoechst Co. under the trademark "Coupler 8") causes ring closure condensation by the reaction with formic acid to give 1-(2',4' - diimino - 3'-hydro-1',3',5'-triazino)-7-hydroxy-naphthalene. This compound, 9 g. (0.033 mol), is suspended in 50 cc. of alcohol and then 10.5 g. (0.05 mol) of dimorpholinomethane are added thereto. This mixture is boiled under reflux for about 4 hours. Ash-colored crystals are separated and filtered off. The crude product thus obtained (11 g., M.P. 209–211° C.) are recrystallized from methyl alcohol to give white crystals (9 g., M.P. 214–215° C.) of 1-(2′,4′-diimino-3′-hydro-1′,3′,5′-triazino)-7-hydroxy-8-morpholinomethyl-naphthalene.

The preferred diazocompounds which give a navy blue or dark blue dye-image having high density and fastness when coupled with the aforementioned coupling components, are those having the following general Formula 2:

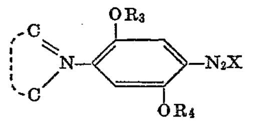

(2)

wherein $R_3$ and $R_4$ are the same or different alkyl radicals of from 1 to 5 carbon atoms,

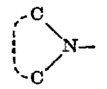

is a substituted or unsubstituted heterocyclic ring system and X is an anion.

Typical diazocompounds having said general formula are, for example, as follow:

1-morpholino-2,5-dimethoxy-4-diazobenzene chloride ½$ZnCl_2$
1-morpholino-2,5-diethoxy-4-diazobenzene chloride ½$ZnCl_2$
1-morpholino-2,5-dipropoxy-4-diazobenzene chloride ½$ZnCl_2$
1-morpholino-2,5-dibutoxy-4-diazobenzene chloride ½$ZnCl_2$
1-morpholino-2,5-diamyloxy-4-diazobenzene chloride ½$ZnCl_2$
1-piperazino-2,5-diamyloxy-4-diazobenzene chloride ½$ZnCl_2$
1-pyrrolidino-2,5-diethoxy-4-diazobenzene chloride ½$ZnCl_2$ Sulfates of the above cited compounds may be also advantageously used.

DESCRIPTION OF THE PREFERRED EMBODIMENTS

The present invention is further illustrated by the following examples.

EXAMPLE 1

A photosensitive solution was prepared from the following ingredients:

Water: 1,000 cc.
Citric acid: 20 g.
Ammonium citrate: 10 g.
Ethylene glycol: 30 g.
1 - (2′,4′-diimino-3′-hydro-1′,3′,5′-triazino)-7-hydroxy-8-morpholinomethyl-naphthalene: 28 g.
1 - morpholino - 2,5 - dibutoxy-4-diazobenzene chloride ½$ZnCl_2$: 12 g.
Saponin: 1 g.
Methylene Blue: 0.05 g.

This solution was applied to a support (e.g. paper or sheet) and then dried off. The two-component diazotype photosensitive material thus obtained gave a vivid navy blue dye-image of high density, when irradiated with light in contact with an image original and subjected to development in the developing solution prepared from the following ingredients:

Water: 1,000 cc.
Potassium carbonate: 20 g.
Potassium tetraborate: 30 g.
Thiourea: 20 g.

The printed material did not show discoloration and fading.

Said photosensitive material gave also a navy blue dye-image of high density by developing in an ammonia vapor.

EXAMPLE 2

A photosensitive solution was prepared from the following ingredients:

Water: 1,000 cc.
Conc. $H_2SO_4$: 5 cc.
Cadmium sulfate: 10 g.
Thiourea: 10 g.
1 - (2′,4′-diimino-3′-hydro-1′,3′,5′-triazino) - 7 - hydroxy-8-dimethylaminomethyl-naphthalene: 20 g.
1-piperazino - 2,5 - diamyloxy - 4 - diazobenzene chloride ½$ZnCl_2$: 10 g.
Saponin: 1 g.
Methylene Blue: 0.05 g.

This solution was applied to a substrate, precoated with an aqueous suspension prepared from the following ingredients, and then dried off.

Water: 1,000 cc.
Corn starch (particle size 1–5$\mu$): 100 g.
Colloidal silica (particle size 1–5$\mu$): 40 g.
Vinyl acetate emulsion (solid 50%): 80 g.

The photosensitive material thus obtained gave a blue dye-image of high density by developing in an 5% aqueous solution of potassium metaborate and also gave a dye-image of good contrast by developing in an ammonia vapor.

EXAMPLE 3

The procedure of Example 1 was repeated except that 1 - morpholino - 2,5 - diethoxy - 4 - diazobenzene chloride ½$ZnCl_2$ was used as a substitute for 1-morpholino-2,5-dibutoxy-4-diazobenzene chloride ½$ZnCl_2$ and the same dye-image as that of Example 1 was obtained.

EXAMPLE 4

A photosensitive solution was prepared from the following ingredients:

Water: 1,000 cc.
Oxalic acid: 5 g.
Conc. $H_2SO_4$: 1 cc.
Cadmium sulfate: 10 g.
Thiourea: 10 g.
1-(2,4′ - diimino - 3′ - hydro - 1′,3′,5′ - triazino) - 7 - hydroxy-8-piperidinomethyl-naphthalene: 25 g.
1-morpholino-2,5-dibutoxy-4-diazobenzene sulfate: 11 g.
Saponin: 1 g.
Methylene blue: 0.05 g.

The photosensitive material prepared from this solution gave a blue dye-image of higher density than that of Example 1.

EXAMPLE 5

The procedure of Example 2 was repeated except that 1-(2′,4′-diimino - 3′ - hydro - 1′,3′,5′-triazino)-7-hydroxy-8-dibutylaminomethyl-naphthalene as a substitute for 1-(2′,4′-diimino - 3′ - hydro - 1′,3′,5′ - triazino)-7-hydroxy-8 - dimethylaminomethyl - naphthalene and the same dye-image as that of Example 2.

What is claimed is:

1. A two-component diazotype photosensitive material comprising a support having a coating thereon wherein the coating contains (a) a coupling component having the following formula:

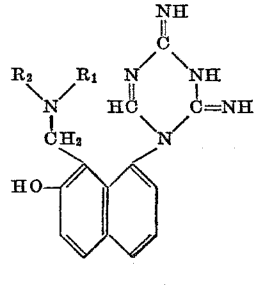

wherein $R_1$ and $R_2$ are the same or different alkyl radicals of from 1 to 4 carbon atoms and when taken together, with the nitrogen atom to which they are attached, form a 5 or 6 member saturated heterocyclic ring and (b) a diazonium compound of the formula:

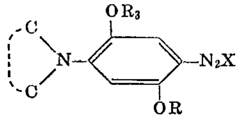

wherein $R_3$ and $R_4$ are the same or different alkyl radicals of from 1 to 5 carbon atoms,

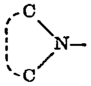

is a 5 or 6 member saturated heterocyclic ring and X is an anion, and (c) an acidic stabilizer.

2. A two-component diazotype photosensitive material as defined in claim 1 wherein said coupling component is 1-(2′,4′ - diimino - 3′ - hydro - 1′,3′,5′ - triazino)-7-hydroxy-8-dimethylaminomethyl-naphthalene.

3. A two-component diazotype photosensitive material as defined in claim 1 wherein said coupling component is 1-(2′,4′-diimino - 3′ - hydro-1′,3′,5′-triazino) - 7 - hydroxy-8-diethylaminomethyl-naphthalene.

4. A two-component diazotype photosensitive material as defined in claim 1 wherein said coupling component is 1-(2′,4′ - diimino - 3′ - hydro - 1′,3′,5′ - triazino)-7-hydroxy-8-dipropylaminomethyl-naphthalene.

5. A two-component diazotype photosensitive material as defined in claim 1 wherein said coupling component is 1-(2′,4′-diimino-3′-hydro-1′,3′,5′-triazino) - 7 - hydroxy-8-dibutylaminomethyl-naphthalene.

6. A two-component diazotype photosensitive material as defined in claim 1 wherein said coupling component is 1-(2′,4′-diimino-3′-hydro-1′,3′,5′-triazino) - 7 - hydroxy-8-morpholinomethyl-naphthalene.

7. A two-component diazotype photosensitive material as defined in claim 1 wherein said coupling component is 1-(2′,4′ - diimino - 3′ - hydro - 1′,3′,5′ - triazino)-7-hydroxy-8-piperazinomethyl-naphthalene.

8. A two-component diazotype photosensitive material as defined in claim 1 wherein said coupling component is 1-(2′,4′-diimino-3′-hydro-1′,3′,5′-triazino) - 7 - hydroxy-8-piperidinomethyl-naphthalene.

References Cited

UNITED STATES PATENTS

| | | | |
|---|---|---|---|
| 2,150,565 | 3/1939 | Schmidt et al. | 96—91 X |
| 2,437,691 | 3/1948 | Grun | 260—249.9 |
| 3,343,960 | 9/1967 | Sus | 96—91 |
| 3,493,378 | 2/1970 | Sus | 96—91 |

FOREIGN PATENTS

| | | | |
|---|---|---|---|
| 864,951 | 1/1953 | Germany | 96—91 |

OTHER REFERENCES

Bann et al., "Chem. Reviews," vol. 58, February 1958, pp. 131–134 relied on.

CHARLES L. BOWERS, Jr., Primary Examiner

U.S. Cl. X.R.

96—49; 260—247.5, 249.9, 268, 293

UNITED STATES PATENT OFFICE
CERTIFICATE OF CORRECTION

Patent No. 3,667,955 Dated June 6, 1972

Inventor(s) Shigeaki Yoshida, et al

It is certified that error appears in the above-identified patent and that said Letters Patent are hereby corrected as shown below:

In the specification:

In column 3, line 55, change "28g" to --25g--.

In the claims:

In claim 1, lines 6-10, change the formula to read --$OR_4$-- in place of "OR".

Signed and sealed this 24th day of April 1973.

(SEAL)
Attest:

EDWARD M.FLETCHER,JR.
Attesting Officer

ROBERT GOTTSCHALK
Commissioner of Patents